US011699317B2

(12) United States Patent
De Marcillac et al.

(10) Patent No.: US 11,699,317 B2
(45) Date of Patent: Jul. 11, 2023

(54) STORAGE ENCLOSURES

(71) Applicant: Hewlett-Packard Development Company, L.P., Spring, TX (US)

(72) Inventors: Patrick De Marcillac, Grenoble (FR); Sandro Secci, Grenoble (FR); Samir Bouraoui, Grenoble (FR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/418,275

(22) PCT Filed: Jul. 26, 2019

(86) PCT No.: PCT/US2019/043559
§ 371 (c)(1),
(2) Date: Jun. 25, 2021

(87) PCT Pub. No.: WO2021/021070
PCT Pub. Date: Feb. 4, 2021

(65) Prior Publication Data
US 2022/0172538 A1    Jun. 2, 2022

(51) Int. Cl.
*G07C 9/27* (2020.01)
*G07C 9/22* (2020.01)
*G07C 9/00* (2020.01)
*H04L 9/40* (2022.01)

(52) U.S. Cl.
CPC ........... *G07C 9/27* (2020.01); *G07C 9/00309* (2013.01); *G07C 9/00896* (2013.01); *G07C 9/22* (2020.01); *H04L 63/02* (2013.01); *H04L 63/0876* (2013.01); *G07C 2009/00793* (2013.01); *G07C 2209/63* (2013.01)

(58) Field of Classification Search
None
See application file for complete search history.

(56) References Cited

U.S. PATENT DOCUMENTS

| 5,944,823 A | 8/1999 | Jade et al. |
| 7,606,854 B2 | 10/2009 | Ellis, III |
| 8,151,337 B2 | 4/2012 | Crowell et al. |
| 8,819,178 B2 | 8/2014 | Baum et al. |
| 8,898,768 B2 | 11/2014 | Ellis |

(Continued)

FOREIGN PATENT DOCUMENTS

| RU | 149331 U1 | 4/2015 |
| SU | 1681304 A1 | 9/1991 |

(Continued)

*Primary Examiner* — Carlos Garcia
(74) *Attorney, Agent, or Firm* — Quarles & Brady LLP

(57) ABSTRACT

In one example, a physical storage enclosure can include a storage area to enclose a device, a locking mechanism to prevent removal of the device from the storage area, a logical configuration system coupled to the device within the storage area, wherein the logical configuration system includes instructions to identify the device within the storage area and alter instructions associated with the device within the storage area, a hardware logistic system coupled to the locking mechanism to activate and deactivate the locking mechanism, and a firewall to restrict communication between the logical configuration system and the hardware logistic system.

15 Claims, 4 Drawing Sheets

(56) References Cited

U.S. PATENT DOCUMENTS

| | | | |
|---|---|---|---|
| 2003/0083009 A1* | 5/2003 | Freyman | H04L 63/10 455/26.1 |
| 2004/0189439 A1 | 9/2004 | Cansino | |
| 2007/0130294 A1 | 6/2007 | Nishio | |
| 2010/0070582 A1 | 3/2010 | Somasekhar | |
| 2014/0239883 A1 | 8/2014 | Hobson et al. | |

FOREIGN PATENT DOCUMENTS

| | | |
|---|---|---|
| TW | 200643715 A | 12/2006 |
| TW | 201003513 A | 1/2010 |
| TW | 201921279 A | 6/2019 |
| WO | WO2014129251 A1 | 8/2014 |

\* cited by examiner

STORAGE ENCLOSURES

BACKGROUND

Storage enclosures can be utilized to securely store devices from unauthorized users. For example, a storage enclosure can include a locker with a storage area and a locking device to prevent unauthorized access to the storage area. In some examples, a storage enclosure can be utilized by a user to securely store a device while the user is at a remote location from the storage enclosure. In other examples, a storage enclosure can be utilized to securely store a device provided by a first user to allow a second user to retrieve the device from the storage enclosure.

DETAILED DESCRIPTION

Figure 1:
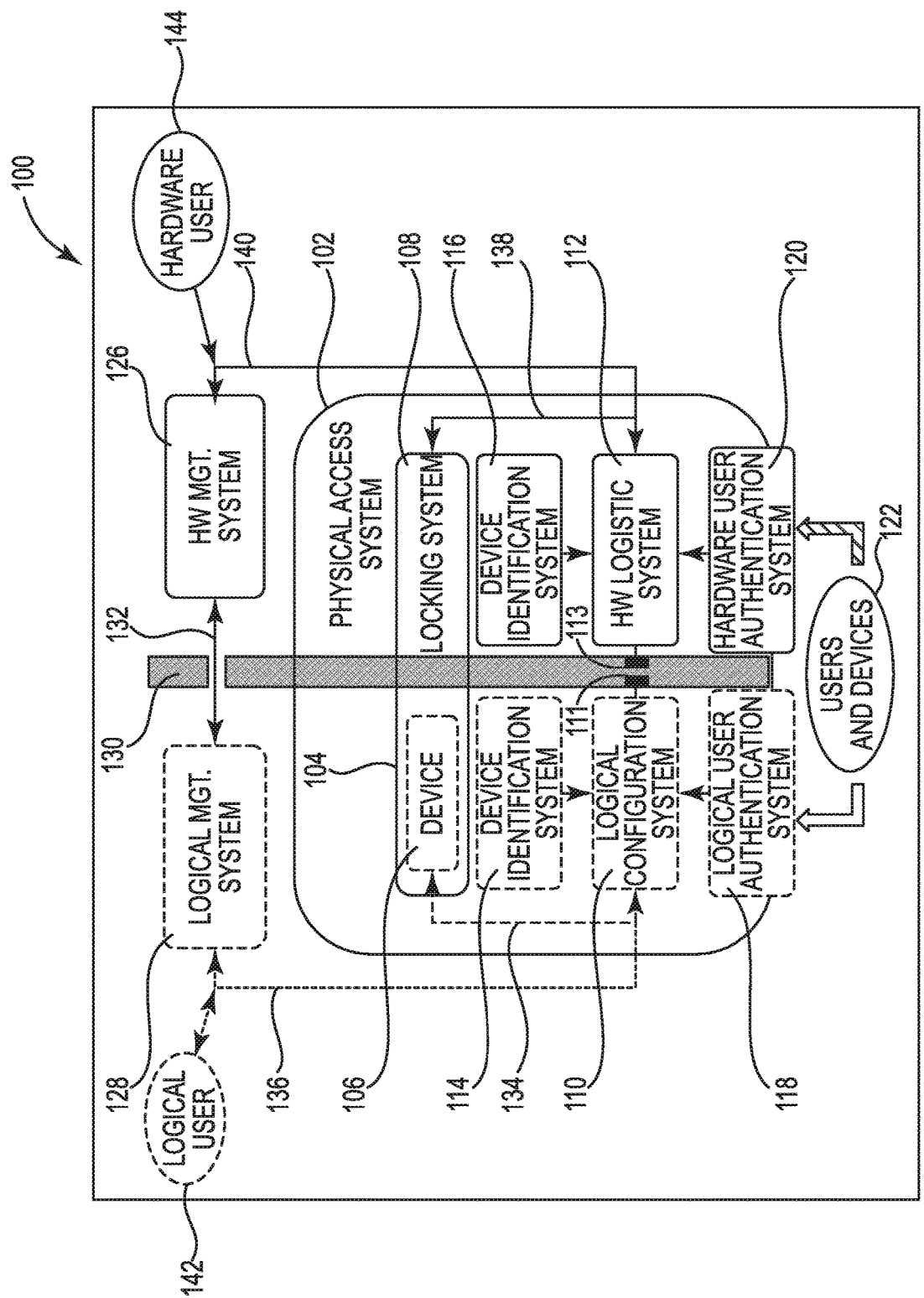
FIG. 1 is an example system for a storage enclosure consistent with the present disclosure.

In some examples, a storage enclosure can be utilized to securely store devices. For example, a storage enclosure can include a locking mechanism to prevent unauthorized access to devices within the storage enclosure. In some examples, the locking mechanism can include an authentication system to authorize a user prior to unlocking or providing access to a storage area of the storage enclosure. For example, the locking mechanism can be activated or in a locked position to prevent access to the storage area of the storage enclosure. In this example, the locking mechanism can be coupled to an authentication system to receive authentication information (e.g., personal identification number (PIN), badge, etc.) to authenticate a user. In this example, the locking mechanism can be switched to a deactivated or an unlocked position when the authentication information is determined to be from an authorized user.

The present disclosure relates to storage enclosures that can be utilized to store computing devices (e.g., desktop, laptop, cell phone, phablet, etc.) or other types of devices. In some examples, the devices may be updated or altered while the device is stored within the storage enclosure. For example, the storage enclosures can include a first network that can be utilized to alter instructions or features of the device while the device is stored within the storage enclosure. In this example, the first network can be utilized to alter instructions or personalize a computing device stored within the storage enclosure and a second network can be utilized to control and/or manage the storage enclosures. In this example, a firewall can be utilized to prevent communication and/or manage communication between the first network and the second network. In this way, the first network can provide access to a first group of authorized users and the second network can provide access to a second group of authorized users. The storage enclosures described herein can provide a secure physical location to store computing devices and a secure network connection to allow authorized users to alter instructions and/or personalize the computing device stored within the storage enclosure.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the present disclosure. In addition, the proportion and the relative scale of the elements provided in the figures are intended to illustrate the examples of the present disclosure and should not be taken in a limiting sense.

FIG. 1 is an example system 100 for a storage enclosure 102 consistent with the present disclosure. The system 100 can include a storage enclosure 102 that can include a storage area 104 to physically enclose or store a device 106 within the storage area 104. In some examples, the storage enclosure 102 can utilize a locking system 108 to lock or prevent access to the device 106 within the storage area 104 when the locking system 108 is activated or in a locked state.

In some examples, the storage enclosure 102 can be a storage room and/or locker with a plurality of storage areas similar to storage area 104. For example, the storage enclosure 102 can be an enclosure or room that includes a plurality of individual enclosures or storage areas that can each be utilized to securely store a device (e.g., device 106, etc.). As described further herein, the storage enclosure 102 can be utilized to securely store and alter the instructions of the device 106 while the device 106 is within the storage area 104 of the storage enclosure 102.

In some examples, the system 100 can include a logical configuration system 110 that can include instructions to identify the device 106 within the storage area 104 and alter instructions associated with the device 106 within the storage area 104. In some examples, the logical configuration system 110 can be communicatively coupled to the device 106 through a communication path 134. For example, the logical configuration system 110 can be coupled to the device 106 through an Ethernet connection, local area network (LAN), and/or other type of communication path. In this way, the logical configuration system 110 can be utilized to communicate with the device 106 while the device 106 is positioned within the storage area 104 of the storage enclosure 102.

In some examples, the logical configuration system 110 can be coupled to the device 106 when the device 106 is positioned within the storage area 104 of the enclosure 102. For example, a user can place the device 106 within the storage area 104 and connect the device 106 to a communication path 134 before utilizing the locking system 108 to lock the device 106 within the storage area 104. In this example, the logical configuration system 110 can be utilized to alter instructions of the device 106 including when the device 106 is locked within the storage area 104. As used herein, altering instructions of the device 106 can include altering software, firmware, and/or instructions (e.g., machine readable instructions, etc.) of the device 106. That is, altering instructions of the device 106 can include updating instructions, altering firmware instructions, downloading a device image, and/or other types of alterations that can be performed through a communication path 134.

In some examples, the logical configuration system 110 can be utilized to determine a device type and/or unique identifier of the device 106 when the device 106 is positioned within the storage area 104. For example, the logical configuration system 110 can be utilized to determine a serial number of the device 106, determine a media access channel (MAC) address associated with the device 106, and/or other information associated with the device 106, In some examples, the logical configuration system 110 can utilize a first device identification system 114 to retrieve the device type and/or unique identifier of the device 106.

In some examples, the system 100 can include a first device identification system 114 that can be utilized to determine a device type and/or unique identifier of the device 106 while the device 106 is positioned within the storage area 104. For example, the first device identification system 114 can include a radio frequency identification (RFID) reader to extract the device type, unique identifier, MAC address, network information, power status, power source and/or other information relating to the device 106 from a RFID tag associated with the device 106. For example, the device 106 can include a passive RFID tag with device information (e.g., device type, unique identifier, MAC address, network connection status, power connection status, etc.) stored on the passive RFID tag. In this example, a manufacturer or organization can store the information on the passive RFID tag and install the passive RFID on or within the device 106.

In other examples, the device 106 can include a dynamic RFID tag. As used herein, a dynamic RFID tag can be a RFID memory resource that stores current or up to date device information by the device 106 when the device 106 is operating. In this way, a dynamic RFID tag can include current device information (e.g., MAC address, unique identifier, network status, power status, correctly connected to a power source, correctly connected to a network, etc.) even if the device information has been altered during operation of the device 106. For example, the device 106 can alter a network status during operation and update the dynamic RFID tag with the updated network status. As used herein, a network status or network connection status can be an indication whether the device 106 is connected to a network (e.g., local area network, wide area network, cellular network, etc.). In a similar way, the dynamic RFID tag can include an updated power status or power connection status. As used herein, the power connection status can include an indication whether the device 106 is connected to a power source (e.g., electrical grid, remote battery, etc.). In this way, the dynamic RFID tag can include updated device information for the device 106 at a time when the device 106 was positioned within the storage area 104. In contrast, a passive RFID tag may include outdated or incorrect device information related to the device 106.

In some examples, the system 100 can include a locking system 108 to lock and unlock the storage area 104 of the storage enclosure 102. For example, the locking system 108 can include a plurality of locking devices that can be utilized to lock a door or hatch that provides access to the storage area 104. In this way, the locking system 108 can be utilized to activate a particular locking device to lock a corresponding storage area (e.g., storage area 104, etc.) to prevent unauthorized access to the device within the corresponding storage area and/or deactivate a particular locking device to unlock a corresponding storage area to allow access to the corresponding storage area.

In some examples, the system 100 can include a hardware logistic system 112 to control the locking system 108 and/or communicate with the locking system 108. For example, the hardware logistic system 112 can be communicatively coupled to the locking system 108 through a communication path 138. In some examples, the hardware logistic system 112 can include instructions to activate and/or deactivate locking devices of the locking system 108, In some examples, the hardware logistic system 112 can include instructions to determine device information of a device 106 positioned within a particular storage area 104. As described herein, the system 100 can include a second device identification system 116 to extract the device information extracted by the first device identification system 114. The device information can be provided to the hardware logistic system 112. In some examples, the second device identification system 116 can include a RFID reader to extract the device information stored on the RFID tag associated with the device 106 in a similar way as the first identification system 114. In some examples, the first identification system 114 and/or the second device identification system 116 can be positioned within the storage area 104 and/or within a readable range of the device 106, As used herein, a readable range of the device 106 can be a distance between an RFID tag and a RFID reader where the RFID reader can extract data (e.g., device information, etc.) from the RFID tag. In some examples, the first identification system 114 can be positioned within the storage area 104 and the second identification system 116 can be positioned outside the storage area 104. In these examples, the second identification system 116 can be positioned within the readable range of the device 106. In this way, an interference between the first identification system 114 and the second identification system 116 can be lowered or eliminated.

In some examples, the hardware logistic system 112 can utilize the device information to determine whether to activate or deactivate the locking devices of the locking system 108. For example, a device 106 can be positioned within the storage area 104 and coupled to the communication path 134. In this example, the device information of the device 106 can be provided to the hardware logistic system 112 as described further herein and the hardware logistic system 112 can determine if the device 106 is positioned within the correct or designated storage area 104. In this example, the hardware logistic system 112 can be utilized to instruct the locking system 108 to lock the storage area 104 when the device 106 is positioned within the storage area 104 or when the device 106 is designated to be positioned within the storage area 104. In some examples, the hardware logistic system 112 can be utilized to instruct the locking system 108 to lock the storage area 104 when the device 108 is connected directly to a power source, communication path 134, and/or within a proximity of the device identification system 114 when the device identification system 114 is an RFID reader. In some examples, a particular storage area can be designated to receive a particular device. For example, an organization can designate a particular storage area to receive a corresponding device from a user to ensure that the corresponding device is delivered before providing a different device to the user. In this example, the hardware logistic system 112 can be utilized to ensure that a correct device is powered and/or connected within a corresponding storage area of the storage enclosure 102.

In some examples, the system 100 can include a firewall 130 to prevent direct communication between the logical configuration system 110 and the hardware logistic system 112. In some examples, the logical configuration system 110 can utilize a first network (e.g., communication path 134, communication path 136, etc.) and the hardware logistic system 112 can utilize a second network (e.g., communication path 138, communication path 140, etc.) that is separated by a firewall 130. In this way, the logical configuration system 110 can be prevented from directly communicating with the hardware logistic system 112. As used herein, a firewall 130 can include a computing system to block unauthorized access to a network or device while allowing outward communication from the network or device.

In some examples, the logical configuration system 110 can utilize the first network and/or the communication path 136 to communication with a logical management system 128, The logical management system 128 can be utilized to manage the logical configuration system 110, For example, the logical management system 128 can provide instructions to the logical configuration system 110 for altering instructions for the device 106 within the storage area 104 and/or other devices positioned within the storage enclosure 102. In a similar way, the hardware logistic system 112 can utilize the second network and/or communication path 140 to communicate with a hardware management system 126. In a similar way, the hardware management system 126 can manage the hardware logistic system 112 by providing instructions to the hardware logistic system 112.

In some examples, the logical management system can be communicatively coupled to the hardware management system 126 through a communication path 132. In some examples, the communication path 132 can be a secured communication path. As used herein, a secured communication path can utilize encryption or other technique to securely transmit communication between a plurality of devices. For example, the logical management system 128 can send encrypted communication to the hardware management system 126 and the hardware management system 126 can send encrypted communication to the logical management system 128 through the communication path 132. In another example, the firewall 130 can be utilized to selectively allow communication through the communication path 132 to allow communication between the hardware management system 126 and the logical management system 128. For example, the communication path 132 can be opened specifically for communication between the hardware management system 126 and the logical management system 128. In this way, the logical management system 128 can communicate directly with the hardware management system 126 without compromising the firewall 130 between the first network and the second network.

As described herein, device information relating to the device 106 can be extracted by the first device identification system 114 while the device 106 is positioned within the storage area 104. In some examples, the first identification system 114 can provide the device information to the logical configuration system 110 and the logical configuration system 110 can provide the device information to the logical management system 128 through the first network and/or communication path 136. In these examples, the logical management system 128 can provide the device information to the hardware management system 126 through the secure communication path 132 and provide the device information to the hardware logistic system 112 or second device identification system 116 through the second network and/or communication path 140. In this way, the device information can be extracted from the device 106 and provided to the hardware logistic system 112 to be utilized as described herein.

In some examples, the first device identification system 114 can utilize a status posting system 111 to post the device information. As used herein, a status posting system 111 can include a memory resource to allow data, such as device information, to be stored or written. In some examples, the status posting system 111 can provide the device information or other data stored in the memory resource to a status reading system 113. As used herein, a status reading system 113 can include a memory resource that can store data, such as device information, to be read. In some examples, the hardware logistic system 112 can read the data stored on the status reading system 113 to determine the device information for the device 106.

In some examples, the first network (e.g., communication path 134, communication path 136, etc.) can be utilized to provide access to a logical user 142 associated with altering the instructions of the device 106 positioned within the storage area 104. For example, a logical user 142 can include a local information technology (IT) administrator, a remote end user of the device 106, and/or a remote IT administrator. In some examples, the second network (e.g., communication path 138, communication path 140, etc.) can be utilized to provide access to a hardware user 144 associated with operating and maintaining the locking system 108. For example, the hardware user 144 can include a local logistic administrator and/or a remote logistic administrator.

In some examples, the system 100 can include a logical user authentication system 118 and a hardware user authentication system 120 to allow users 122 that are physically located or remote to the storage enclosure 102 to gain access to the respective systems (e.g., logical configuration system 110, hardware logistic system 112, etc.). For example, a user 122 can provide credentials to the logical user authentication system 118 to access the logical configuration system 110 and/or the storage area 104 to access the device 106 and/or position the device 106 within the storage area 104. In a similar example, the user 122 can provide credentials to the hardware user authentication system 120 to gain access to the hardware logistic system 112 and/or locking system 108. In these examples, the correct credentials provided to the logical user authentication system 118 to gain access can be different than the correct credentials provided to the hardware user authentication system 120 to gain access. In some examples, the firewall 130 can prevent communication between the hardware user authentication system 120 and the logical user authentication system 118. In this way, a first group of users can have authorization to the logical authentication system 118 and a second group of users can have authorization to the hardware user authentication system 120. This can increase the security of the system 100. In some examples, a user can part of the first group of users and the second group of users.

The system 100 can provide for secure storage of devices, such as device 106. In addition, the system 100 can provide for a secure location to alter instructions associated with the device 106 while the device 106 is within the storage area 104. In this way, the device 106 can be securely stored within the storage area 104 and updated or altered through the logical configuration system 110 including when the device is stored within the storage area 104. In this way, an organization can allow devices, such as device 106, to be dropped off by a user and a different device to be picked up by the user without risk that the devices are stolen or altered by an unauthorized user. In addition, the system 100 allows a user to alter or update a device 106 while the device 106 is positioned within the storage area 104 prior to picking up the device from the storage area 104. In this way, the user can personalize and/or delegate personalization of the device 106 before picking up the device from the storage area 104.

Figure 2:
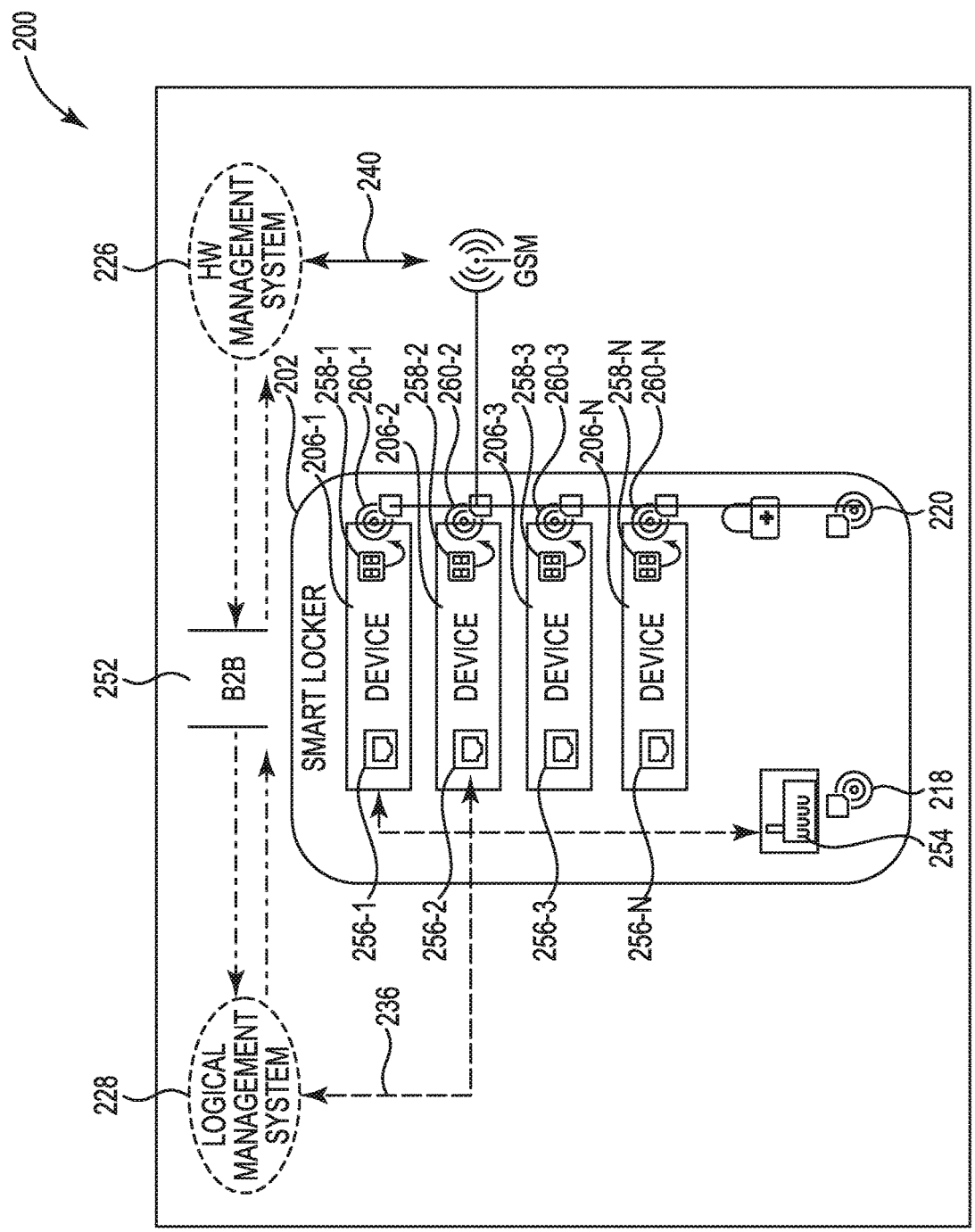
FIG. 2 is an example system for a storage enclosure consistent with the present disclosure.

FIG. 2 is an example system 200 for a storage enclosure 202 consistent with the present disclosure. In some examples, the system 200 can include the same or similar elements as system 100 as referenced in FIG. 1. For example, the system 200 can include a storage enclosure 202 that can store a plurality of devices 206-1, 206-2, 206-3, 206-N within a storage area and/or within a plurality of corresponding storage areas. In addition, the system 200 can include a logical management system 228 and a hardware management system 226, In some examples, the logical management system 228 can be communicatively coupled to the plurality of devices 206-1, 206-2, 206-3, 206-N through a first network 236 and the hardware management system 226 can be communicatively coupled to the locking mechanisms and/or device identification devices 260-1, 260-2, 260-3, 260-N through a second network 240.

As described herein, the first network 236 can be distinct and/or separated from the second network 240. For example, the first network 236 can be separated from the second network 240 by a firewall (e.g., firewall 130 as referenced in FIG. 1, etc.). In some examples, the first network 236 and the second network 240 can be separate networks that operate independently. In other examples, the first network 236 and the second network 240 can be a shared network or hybrid network such that access to one network allows access to the other network when security between the logical management system 228 and the hardware management system 226 is not a concern.

In some examples, the plurality of devices 206-1, 206-2, 206-3, 206-N can include corresponding network connections 256-1, 256-2, 256-3, 256-N. As used herein, a network connection can be a device that is capable of connecting to a network. For example, the network connections 256-1, 256-2, 256-3, 256-N can be Ethernet ports, wireless network controllers, and/or other types of connections to communicatively couple the plurality of devices 206-1, 206-2, 206-3, 206-N to the first network 236 and/or to the logical management system 228, In some examples, a device from the plurality of devices 206-1, 206-2, 206-3, 206-N can be positioned within the storage enclosure 202 and communicatively coupled to the first network 236 and/or the logical management system 228 prior to locking the storage enclosure 202 and/or corresponding storage area.

For example, a first device 206-1 can be positioned within the storage enclosure 202. In this example, a first network connection 256-1 for the first device 206-1 can be coupled to the first network 236 and/or the logical management system 228. In this example, the logical management system 228 can confirm that the first device 206-1 is communicatively coupled and positioned within the storage enclosure 202. In this example, the logical management system 228 can utilize a business to business (B2B) network 252 to inform the hardware management system 226 that the first device 206-1 is positioned within the storage enclosure 202 and is communicatively coupled to the logical management system 228, In this example, the hardware management system 226 can lock the corresponding storage area for the first device 206-1 and/or lock the storage enclosure 202 in response to receiving an instruction that the first device 206-1 is positioned within the storage enclosure 202 and is communicatively coupled to the first network 236 and/or the logical management system 228. As used herein, the B2B network 252 can be a network where a first business exchanges information with a second business.

In some examples, the hardware management system 226 can extract device information from the plurality of devices 206-1, 206-2, 206-3, 206-N. As described herein, the device information can include details relating to the plurality of devices 206-1, 206-2, 206-3, 206-N. For example, the device information can include a unique identifier (e.g., serial number, model number, etc.) of the plurality of devices 206-1, 206-2, 206-3, 206-N, MAC addresses associated with the plurality of devices 206-1, 206-2, 206-3, 206-N, and/or other information related to the plurality of devices 206-1, 206-2, 206-3, 206-N.

In some examples, the device information can be stored on a corresponding memory resource of the plurality of devices 206-1, 206-2, 206-3, 206-N. For example, the plurality of devices 206-1, 206-2, 206-3, 206-N can include a corresponding RFID tag 258-1, 258-2, 258-3, 258-N. As described herein, a RFID tag can include a memory resource coupled to a radio frequency device. For example, the plurality of RFID tags 258-1, 258-2, 258-3, 258-N can include a memory resource to store device information and a radio frequency transmitter to transmit the stored device information to a RFID reader. In some examples, the plurality of RFID tags 258-1, 258-2, 258-3, 258-N can include an excitation coil that can receive radio frequency waves to generate power for the RFID transmitter. In these examples, a RFID reader can provide radio frequency waves to the excitation coil and the plurality of RFID tags 258-1, 258-2, 258-3, 258-N can transmit the corresponding device information to the RFID reader in response to the excitation coil receiving the radio frequency waves.

In some examples, the plurality of RFID tags 258-1, 258-2, 258-3, 258-N can be passive RFID tags. As used herein, a passive RFID tag can include a memory resource that includes static device information. The device information can be static when the device information is not updated by a corresponding device during operation of the corresponding device. In other examples, the plurality of RFID tags 258-1, 258-2, 258-3, 258-N can be dynamic RFID tags. As used herein, a dynamic RFID tag can include a memory resource that is actively updated (e.g., periodically, during a boot, etc.) by a device with device information. As described herein, a dynamic RFID tag can be updated by the device during operation. For example, the device 206-1 can include an active RFID tag 258-1. In this example, the device 206-1 can check the accuracy of the data stored on the RFID tag 258-1 and determine if the data needs to be altered or updated based on a comparison of the data to a current status of the device. If the data is out of date or incorrect, the device 206-1 can alter the information stored on the RFID tag 258-1. In this way, the device information stored on the RFID tag 258-1 can be determined to be current device information for the device 206-1 when the RFID tag 258-1 is an active RFID tag.

In some examples, the system 200 can include a plurality of device identification devices 260-1, 260-2, 260-3, 260-N communicatively coupled to the hardware management system 226 through the second network 240. In some examples, the plurality of device identification devices 260-1, 260-2, 260-3, 260-N can include RFID readers to extract device information from the plurality of RFID tags 258-1, 258-2, 258-3, 258-N. As described herein, the device information can include a serial number, MAC address, model number, among other information related to the plurality of devices 206-1, 206-2, 206-3, 206-N. In some examples, the hardware management system 226 can activate or deactivate a locking system or locking device based on the device information. For example, a particular storage area may be prepared for a particular device from the plurality of devices 206-1, 206-2, 206-3, 206-N, In this example, the hardware management system 226 can utilize the device information to confirm that the correct device is positioned, powered, and/or communicatively connected within the correct storage area. In other examples, the hardware management system 226 can utilize the B2B network 252 to transfer the device information to the logical management system 228.

In some examples, the system 200 can include an image loader 254. In some examples, the image loader 254 can be a configuration device to load a device image on to the plurality of devices 206-1, 206-2, 206-3, 206-N, In some examples, the image loader 254 can include a plurality of device images that can correspond to a plurality of different users. For example, a first user can utilize a first device image and a second user can utilize a second device image. In this example, the first device image can include a first set of settings, preferences, and/or applications to be applied to a particular device and the second device image can include a second set of settings, preferences, and/or applications to be applied to a particular device. In this example, the image loader 254 can apply a first device image to the first device 206-1 that corresponds to a first user and apply a second device image to the second device 206-2 that corresponds to a second user. In this way, each of the plurality of devices 206-1, 206-2, 206-3, 206-N can be uniquely configured for a particular user of the device.

In some examples, the image loader 254 can include a wake on LAN (WOL) function. As used herein, a WOL function can allow the image loader 254 or other device to activate the plurality of devices 206-1, 206-2, 206-3, 206-N and perform functions (e.g., provide a device image, etc.) on the plurality of devices 206-1, 206-2, 206-3, 206-N. In these examples, the image loader 254 and the plurality of devices 206-1, 206-2, 206-3, 206-N can be communicatively coupled to the first network 236. In this way, a first device 206-1 can be activated from a deactivated or off state such that the image loader 254 is able to download a particular device image to the first device 206-1. In this example, the image loader 254 can deactivate the first device 206-1 once the particular device image is installed on the first device 206-1. This can allow the first device 206-1 to include particular settings, preferences, and/or applications for a particular user before the user picks up the device from the storage enclosure 202.

In some examples, the system 200 can include a logical user authentication system 218 and a hardware user authentication system 220 to allow users that are physically located or remote to the storage enclosure 202 to gain access to the respective systems. For example, a user picking up the first device 206-1 and dropping off the second device 206-2 can provide credentials to the logical user authentication system 218. When the user is authorized, the user is capable of unlocking the first device 206-1 from the storage area and locking the second device 206-2 within the storage area. In this way, the user can replace the second device 206-2 with the first device 206-1 without having to configure the first device 206-1 since the first device 206-1 can be loaded with a particular device image prior to the user dropping off the second device 206-2. In addition, the user may not have to alter the settings of the second device 206-2 prior to dropping off the second device 206-2 since the image loader 254 is capable of altering the instructions of the second device 206-2 when the second device 206-2 is communicatively coupled to the first network 236 as described herein.

The system 200 can provide for secure storage of devices, such as the plurality of devices 206-1, 206-2, 206-3, 206-N. In addition, the system 200 can provide for a secure location to alter instructions associated with the plurality of devices 206-1, 206-2, 206-3, 206-N while the plurality of devices 206-1, 206-2, 206-3, 206-N are stored within the storage enclosure 202, In this way, the plurality of devices 206-1, 206-2, 206-3, 206-N can be securely stored within the storage enclosure 202 and updated or altered while the plurality of devices 206-1, 206-2, 206-3, 206-N are stored within the storage enclosure 202. In addition, the system 200 allows a user to alter or update a device while the device is positioned within the storage enclosure 202 prior to picking up the device from the storage enclosure 202. In this way, the user can personalize the device before picking up the device from the storage enclosure.

Figure 3:
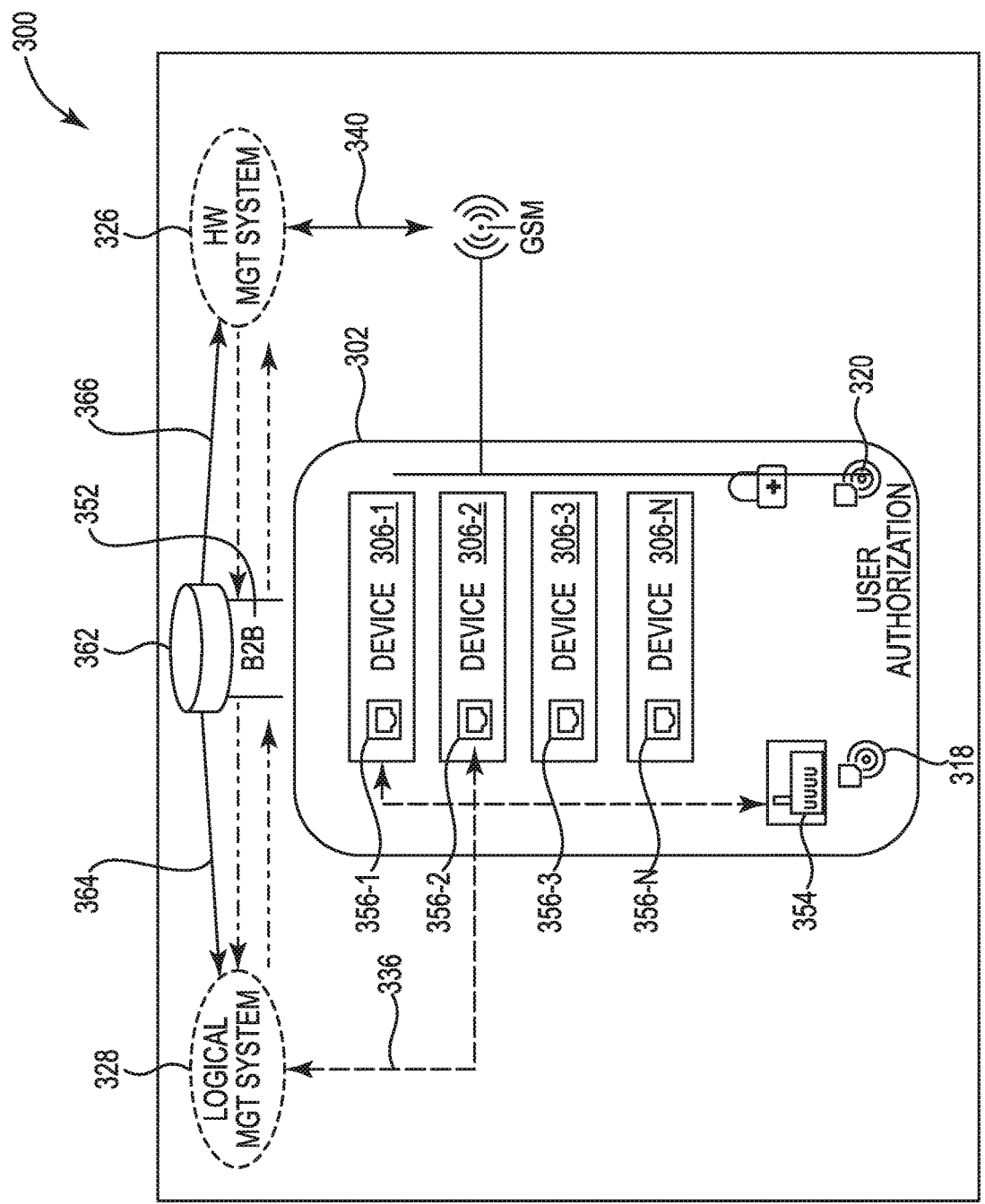
FIG. 3 is an example system for a storage enclosure consistent with the present disclosure.

FIG. 3 is an example system 300 for a storage enclosure 302 consistent with the present disclosure. In some examples, the system 300 can include the same or similar elements as system 100 as referenced in FIG. 1 and/or system 200 as referenced in FIG. 2. For example, the system 300 can include a storage enclosure 302 that can store a plurality of devices 306-1, 306-2, 306-3, 306-N within a storage area and/or within a plurality of corresponding storage areas. In addition, the system 300 can include a logical management system 328 and a hardware management system 326. In some examples, the logical management system 328 can be communicatively coupled to the plurality of devices 306-1, 306-2, 306-3, 306-N through a first network 336 and the hardware management system 326 can be communicatively coupled to the locking mechanisms through a second network 340.

As described herein, the first network 336 can be distinct and/or separated from the second network 340. For example, the first network 336 can be separated from the second network 340 by a firewall (e.g., firewall 130 as referenced in FIG. 1, etc.). In some examples, the first network 336 and the second network 340 can be separate networks that operate independently. In other examples, the first network 336 and the second network 340 can be a shared network or hybrid network such that access to one network allows access to the other network when security between the logical management system 328 and the hardware management system 326 is not a concern.

In some examples, the plurality of devices 306-1, 306-2, 306-3, 306-N can include corresponding network connections 356-1, 356-2, 356-3, 356-N. As described herein, a network connection can be a device that is capable of connecting to a network. For example, the network connections 356-1, 356-2, 356-3, 356-N can be Ethernet ports, wireless network controllers, and/or other types of connections to communicatively couple the plurality of devices 306-1, 306-2, 306-3, 306-N to the first network 336 and/or to the logical management system 328. In some examples, a device from the plurality of devices 306-1, 306-2, 306-3, 306-N can be positioned within the storage enclosure 302 and communicatively coupled to the first network 336 and/or the logical management system 328 prior to locking the storage enclosure 302 and/or corresponding storage area.

In some examples, the logical management system 328 and/or the hardware management system 326 can utilize device information for the plurality of devices 306-1, 306-2, 306-3, 306-N. For example, the logical management system 328 can utilize a unique identifier and/or a MAC address of the plurality of devices 306-1, 306-2, 306-3, 306-N to alter instructions associated with the plurality of devices 306-1, 306-2, 306-3, 306-N. In other examples, the hardware management system 326 can utilize the device information to confirm a particular device is stored in a particular storage area of the storage enclosure 302. In some examples, the hardware management system 326 can determine whether to lock or unlock a particular storage area based on the device information. In these examples, a particular user may want to access a particular storage area and the hardware management system 326 can confirm that a corresponding device is positioned within the particular storage area prior to unlocking the particular storage area for the user. B2

In some examples, the system 300 can include a database 362 that can be utilized to store device information for the plurality of devices 306-1, 306-2, 306-3, 306-N and/or other devices. In some examples, the database 362 can include unique identifiers, serial numbers, MAC addresses, and/or other device information for the plurality of devices 306-1, 306-2, 306-3, 306-N. In some examples, the database can be communicatively coupled to the logical management system 328 through a first communication path 364 and communicatively coupled to the hardware management system 326 through a second communication path 366. In some examples, the first communication path 364 can be separated from the second communication path 366. For example, the first communication path 364 and the second communication path 366 can be separated by a firewall as described herein. In this way, the logical management system 328 and the hardware management system 326 can each securely obtain device information for a particular device stored within the storage enclosure 302.

In some examples, the logical management system 328 and the hardware management system 326 can communicate over the B2B network 352. For example, the logical management system 328 can determine a location or storage area of a particular device from the plurality of devices 306-1, 306-2, 306-3, 306-N. In this example, the logical management system 328 can request the device information from the database 362 for the particular device. In this example, the logical management system 328 can provide the storage location for the particular device to the hardware management system 326 and the hardware management system 326 can request the device information for the particular device from the database 362. As descried herein, the hardware management system 326 can utilize the storage location of the particular device and/or the device information to determine whether to lock or unlock a particular storage area of the storage enclosure 302.

In some examples, the system 300 can include an image loader 354. As described herein, the image loader 354 can be a configuration device to load a device image on to the plurality of devices 306-1, 306-2, 306-3, 306-N. In some examples, the image loader 354 can include a plurality of device images that can correspond to a plurality of different users. For example, a first user can utilize a first device image and a second user can utilize a second device image. As described herein, the image loader 354 can include a WOL function. As described herein, the system 300 can include a logical user authentication system 318 and a hardware user authentication system 320 to allow local users that are physically located to the storage enclosure 302 to gain access to the respective systems.

The system 300 can provide for secure storage of devices, such as the plurality of devices 306-1, 306-2, 306-3, 306-N. In addition, the system 300 can provide for a secure location to alter instructions associated with the plurality of devices 306-1, 306-2, 306-3, 306-N while the plurality of devices 306-1, 306-2, 306-3, 306-N are stored within the storage enclosure 302, In this way, the plurality of devices 306-1, 306-2, 306-3, 306-N can be securely stored within the storage enclosure 302 and updated or altered while the plurality of devices 306-1, 306-2, 306-3, 306-N are stored within the storage enclosure 302.

Figure 4:
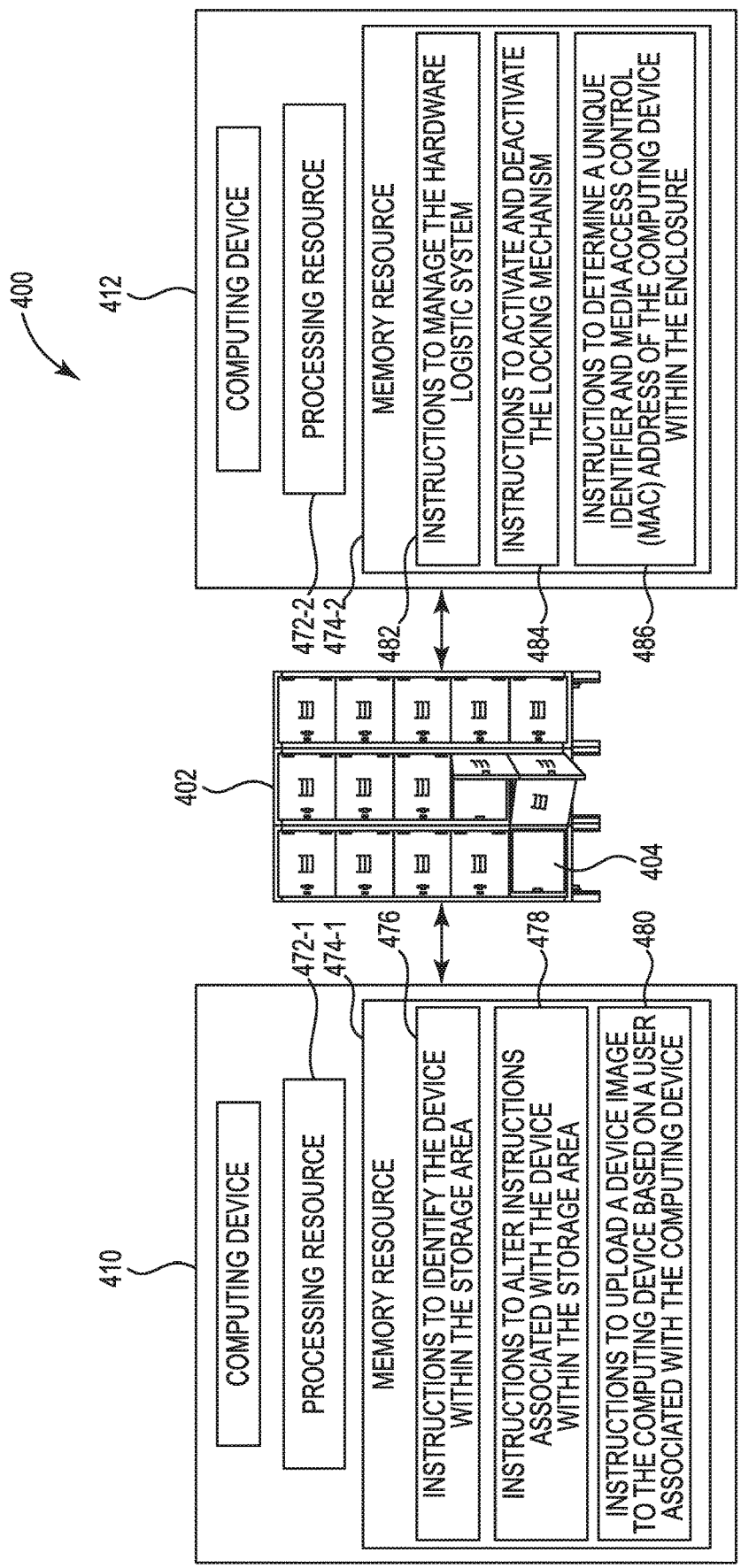
FIG. 4 is an example system for a storage enclosure consistent with the present disclosure.

FIG. 4 is an example system 400 for a storage enclosure 402 consistent with the present disclosure. In some examples, the system 400 can include the same or similar elements as system 100 as referenced in FIG. 1, system 200 as referenced in FIG. 2, and/or system 300 as referenced in FIG. 3. For example, the system 400 can include a storage enclosure 402 that can store a plurality of devices within a storage area 404 and/or within a plurality of corresponding storage areas.

The system 400 can include a first computing device 410 and a second computing device 412. In some examples, the first computing device 410 can be utilized as a logical configuration system (e.g., logical configuration system 110 as referenced in FIG. 1, etc.) and the second computing device 412 can be utilized as a hardware logistic system (e.g., hardware logistic system 112 as referenced in FIG. 1, etc.). In some examples, the first computing device 410 and the second computing device 412 can include a corresponding processing resource 472-1, 472-2 and/or a corresponding memory resource 474-1, 474-2 storing instructions to perform particular functions. A processing resource, as used herein, can include a number of processing resources capable of executing instructions stored by a memory resource. The instructions (e.g., machine-readable instructions (MRI)) can include instructions stored on the memory resource and executable by the processing resource to implement a particular function. The memory resource, as used herein, can include a number of memory components capable of storing non-transitory instructions that can be executed by the processing resource.

The memory resource can be in communication with the processing resource via a communication link (e.g., path). The communication link can be local or remote to an electronic device associated with the processing resource. The memory resource 474-1 includes instructions 476, 478, 480 and the memory resource 474-2 includes instructions 482, 484, 486. The memory resources 474-1, 474-2 can include more or fewer instructions than illustrated to perform the various functions described herein. In some examples, instructions (e.g., software, firmware, etc.) can be downloaded and stored in memory resource (e.g., MRM) as well as a hard-wired program (e.g., logic), among other possibilities. In other examples, the computing devices 410, 412 can be hardware, such as an application-specific integrated circuit (ASIC), that can include instructions to perform particular functions.

The first computing device 410 can include instructions 476, when executed by a processing resource 472-1 can identify the device within the storage area 404 of a storage enclosure 402. As described herein, the first computing device 410 can identify the device within the storage area 404 utilizing device information associated with the device. In some examples, the device can include a passive or dynamic RFID tag that can allow the first computing device 410 to extract the device information utilizing a RFID reader device.

The first computing device 410 can include instructions 478, when executed by a processing resource 472-1 can alter instructions associated with the device within the storage area 404 of the storage enclosure 402. As described herein, altering instructions associated with the device can include altering settings of the device, updating instructions or firmware of the device, and/or downloading a device image to the device. As described herein, altering the instructions associated with the device can include personalizing the device for a particular user by altering specific instructions of the device based on user preferences.

The first computing device 410 can include instructions 480, when executed by a processing resource 472-1 can upload a device image to a computing device based on a user associated with the computing device. As described herein, a device image can be a set of instructions to provide particular settings, preferences, and/or applications to a particular device. The device image can be applied such that a particular user can more easily utilize the device.

The second computing device 412 can include instructions 482, when executed by a processing resource 472-2 can manage a hardware logistic system of the storage enclosure 402. In some examples, the managing the hardware logistic system can include instructions to provide device information to the hardware logistic system, instruct the hardware logistic system to activate or deactivate particular locking mechanisms, and/or authenticate users attempting to access the hardware logistic system. In some examples, this function can be performed by a hardware management system as described herein.

The second computing device 412 can include instructions 484, when executed by a processing resource 472-2 can activate and deactivate the locking mechanism of a storage area 404 of the storage enclosure 402. As described herein, the second computing device 412 can be communicatively coupled to the locking mechanism of a storage area 404 and/or the storage enclosure 402. In some examples, the second computing device 412 can activate and/or deactivate the locking mechanism based on the device information. For example, the second computing device 412 can deactivate the locking mechanism to allow an authorized user access to a particular storage area 404, In this example, the second computing device 412 can activate the locking mechanism when an authorized user places an authorized device within the storage area 404.

The second computing device 412 can include instructions 486, when executed by a processing resource 472-2 can determine a unique identifier and Media Access Control (MAC) address of a computing device within a storage area 404 of the storage enclosure 402. As described herein, the device information for a device such as a computing device can include the MAC address and unique identifier for the computing device. In this way, the second computing device 412 can determine the unique identifier and/or MAC address of the computing device based on device information that can be extracted from an RFID tag associated with the computing device stored within the storage area 404 of the storage enclosure 402.

The system 400 can provide for secure storage of devices, such as computing devices. In addition, the system 400 can provide for a secure location to alter instructions associated with the plurality of devices while the plurality of devices are stored within the storage enclosure 402. In this way, the plurality of devices can be securely stored within a storage area 404 of the storage enclosure 402 and updated or altered while the plurality of devices are stored within the storage enclosure 402.

The above specification, examples and data provide a description of the method and applications and use of the system and method of the present disclosure. Since many examples can be made without departing from the spirit and scope of the system and method of the present disclosure, this specification merely sets forth some of the many possible example configurations and implementations.

What is claimed:

1. A physical storage enclosure, comprising:
   a locking mechanism to prevent removal of a device from a storage area;
   a logical configuration system coupled to the device at the storage area, wherein the logical configuration system includes instructions to identify the device at the storage area and alter instructions associated with the device at the storage area;
   a hardware logistic system coupled to the locking mechanism to activate and deactivate the locking mechanism; and
   a firewall to restrict communication between the logical configuration system and the hardware logistic system.

2. The physical storage enclosure of claim 1, wherein the logical configuration system is coupled to a first network that provides communication to the device at the storage area.

3. The physical storage enclosure of claim 2, wherein the hardware logistic system is coupled to a second network that provides communication to the locking mechanism.

4. The physical storage enclosure of claim 3, wherein the firewall restricts communication between the first network and the second network.

5. The physical storage enclosure of claim 1, wherein the hardware logistic system includes a first authentication system to authenticate a user attempting to access the hardware logistic system and the logical configuration system includes a second authentication system to authenticate a user attempting to access the logical configuration system.

6. The physical storage enclosure of claim 5, wherein the firewall restricts communication between the first authentication system and the second authentication system.

7. A system, comprising:
   an enclosure to receive a computing device and store the computing device within the enclosure;
   a locking mechanism coupled to lock the enclosure when the locking mechanism is activated;
   a logical configuration system coupled to the computing device within the enclosure to alter instructions associated with the computing device within the enclosure;
   a logical management system to manage the logical configuration system and a plurality of additional logical configuration systems;
   a hardware logistic system coupled to the locking mechanism to activate and deactivate the locking mechanism;
   a hardware management system to manage the hardware logistic system and a plurality of additional hardware logistic systems; and
   a firewall to restrict communication between the logical configuration system and the hardware logistic system and allow communication between logical management system and the hardware management system.

8. The system of claim 7, wherein the logical configuration system is coupled to the logical management system through a first network connection and wherein the hardware logistic system is coupled to the hardware management system through a second network connection.

9. The system of claim 7, wherein the logical management system provides identification of the computing device to the hardware management system through the firewall.

10. The system of claim 7, wherein the logical configuration system includes instructions to determine a unique identifier and Media Access Control (MAC) address of the computing device within the enclosure.

11. The system of claim 7, comprising an identification system to retrieve a network connection status and power connection status for the computing device from a dynamic radio frequency (RF) tag of the computing device, wherein the dynamic RF tag is updated with the network connection status and the power connection status by the computing device when the computing device is activated.

12. The system of claim 11, wherein the identification system includes an RFID reader positioned within a readable range of the enclosure to retrieve the unique identifier and MAC address from the dynamic RF tag.

13. A computing device storage enclosure, comprising:
   an enclosure to store the computing device within the enclosure;

a locking mechanism coupled to lock the enclosure when the locking mechanism is activated;

a device identification system to determine a unique identifier of the computing device positioned within the enclosure;

a logical configuration system coupled to the computing device through a first network within the enclosure to alter instructions associated with the computing device within the enclosure based on the unique identifier of the computing device positioned within the enclosure;

a status posting system to receive a status update for altered instructions performed by the logical configuration system and to receive the unique identifier of the computing device;

a status reading system to receive the status update for altered instructions performed by the logical configuration system and to receive the unique identifier of the computing device;

a hardware logistic system coupled to the locking mechanism through a second network to activate and deactivate the locking mechanism based on the unique identifier received from the hardware positing system; and a firewall to restrict communication between the logical configuration system and the hardware logistic system and restrict communication between the first network and the second network.

14. The computing device storage enclosure of claim 13, wherein the logical configuration system includes instructions to upload a device image to the computing device based on a user associated with the computing device.

15. The computing device storage enclosure of claim 13, wherein the first network includes a first authentication system to provide access to the first network and the second network includes a second authentication system to provide access to the second network.

* * * * *